United States Patent [19]

Lo Galbo et al.

[11] Patent Number: 5,280,629
[45] Date of Patent: Jan. 18, 1994

[54] TECHNIQUE FOR MEASURING CHANNEL DELAY

[75] Inventors: Robert D. Lo Galbo, Elk Grove Village; Bradley M. Hiben, Glenellyn; Mark C. Cudak, McHenry, all of Ill.

[73] Assignee: Motorola, Inc., Schaumburg, Ill.

[21] Appl. No.: 804,860

[22] Filed: Dec. 6, 1991

[51] Int. Cl.$^5$ .................................. H04B 7/00
[52] U.S. Cl. .................. 455/51.2; 455/12.1; 455/67.4; 455/67.6; 375/110
[58] Field of Search ............. 455/11.1, 12.1, 13.2, 455/51.2, 57.1, 59, 67.4, 67.6, 69–70; 375/10, 110; 379/63

[56] References Cited

U.S. PATENT DOCUMENTS

| | | | |
|---|---|---|---|
| 3,128,465 | 4/1964 | Brilliant | 455/69 |
| 4,709,402 | 11/1987 | Akerberg | 455/69 |
| 4,882,739 | 11/1989 | Potash et al. | 455/69 |
| 5,070,537 | 12/1991 | Ohira et al. | 455/12.1 |
| 5,105,439 | 4/1992 | Bennett et al. | 455/51.2 |

FOREIGN PATENT DOCUMENTS 3270422 12/1991 Japan ................. 455/13.2

*Primary Examiner*—Reinhard J. Eisenzopf
*Assistant Examiner*—Andrew Faile
*Attorney, Agent, or Firm*—Wayne J. Egan

[57] ABSTRACT

A method for measuring channel delay measures the delay for a message to propagate from a prime site (100, 400) to a remote site (200, 500) via the channel (300, 600). The prime site includes a clock for providing a first value, T1, based on the current time at the prime site. The remote site includes a clock for providing a second value, T2, based on the current time at the remote site. Both clocks are synchronized with a common timing source, such as a GPS satellite timing signal. Therefore, T2 equals T1. In one embodiment, the prime site determines T1, and simultaneously sends a message to the remote site via the channel, the message including T1. Upon receiving the message, the remote site simultaneously determines T2. The remote site decodes the message to determine T1, and then determines the delay based on the difference between T2 and T1.

5 Claims, 2 Drawing Sheets

TECHNIQUE FOR MEASURING CHANNEL DELAY

FIELD OF THE INVENTION

This application relates to methods for measuring channel delay including, but not limited to, methods for measuring channel delay in simulcast systems.

BACKGROUND OF THE INVENTION

There are many situations in which it is necessary to measure the one-way delay incurred by messages that are transported between two sites coupled by a channel.

In the past, typically the measurement of a one-way delay through a channel has used a "round-trip" calculation approach. With such a method, typically a central site, A, would first record the initial time, and then send a predetermined signal through the channel that couples the central site to the remote site, B. At the B site, the channel would loop-back on itself, thus coupling the receive path to the transmit path. As a result, the signal would ultimately return to the A site. Upon receipt of the signal, the A site would note the elapsed time. The one-way channel delay would then be calculated by dividing the elapsed time by the value 2.

The problem with such an approach is that it does not take into account the asymmetries between the transmit and receive paths. Thus, it may be that the time needed for the signal to travel from A to B was greater than (or less than) the time for the signal to travel from B to A.

In most real-life applications, such asymmetries can be substantial. As a result, if the application depends on precisely measuring the one-way delay, the above round-trip approach can result in substantial errors.

One application that requires precise measurements of one-way channel delays is simulcast systems. The use of simulcast transmission to increase the effective coverage area of land-mobile radio systems is well known. In simulcast transmission, two or more transmitters, broadcasting the identical message simultaneously on the same frequency, are located so that coverage is available over a larger area than can be covered by the individual transmitters acting alone.

As is known, such simulcast transmission systems require that the message be transmitted from all transmitter sites at exactly the same time. If the message is transmitted by various transmitters at different times, this causes substantial distortion for subscriber units located in an over-lap area where the message is received from multiple transmitters. This distortion occurs when the various transmissions of the message arrive at a receiving subscriber unit with even slight phase or timing differences with respect to each other.

The fundamental problem with achieving proper simulcast operation is how to synchronize message transmissions at all transmitter sites. Typically the messages are formed at a central, or "prime" site, and then delivered by distribution channels to the remote sites for broadcast by the transmitters located there. To guarantee a time-precise arrival of messages at the remote sites, therefore, the delay introduced by the channels connecting the prime to the remote sites must be determined with precision.

In general, each channel will have a different delay. Once these individual delays are exactly known, then simultaneous transmissions of messages from all transmitters may be achieved by compensating for the variations in channel delays. Thus system-wide synchronization of all transmitters may be achieved only if the one-way delays for all channels can be precisely measured.

Accordingly, there is a need for an improved method for measuring channel delay.

DETAILED DESCRIPTION

Figure 1:
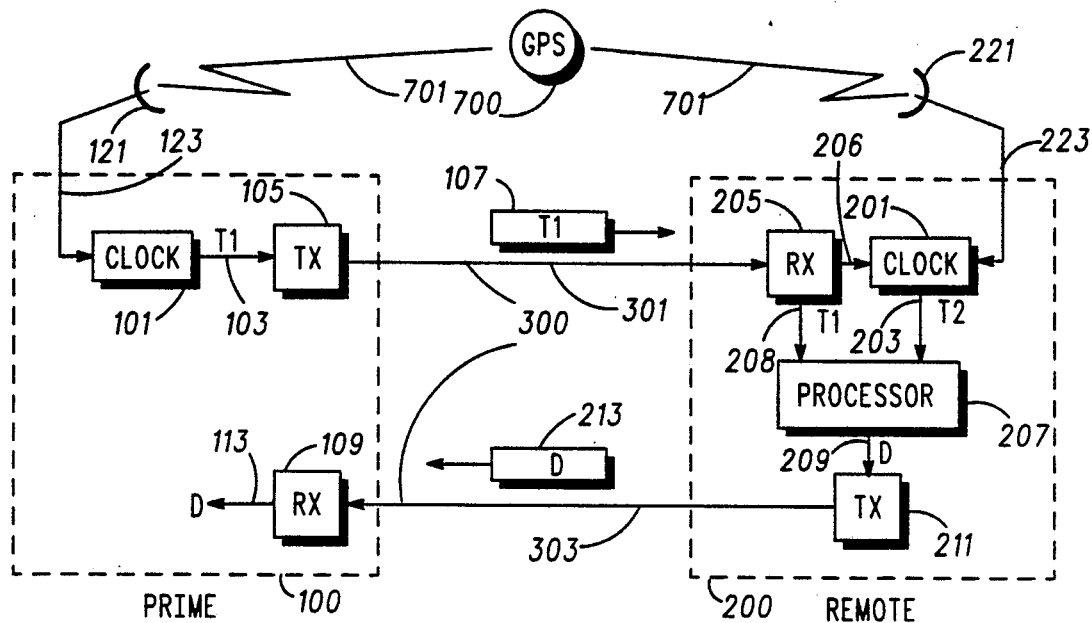
FIG. 1 is a block diagram that shows a prime coupled to a remote via a channel and arranged with a first embodiment of a technique for measuring channel delay, in accordance with the present invention.

Referring now to FIG. 1, there is depicted a communications system including a prime 100 coupled to a remote 200 via a channel 300. The prime 100 includes a clock 101 that provides a first value, T1, based on the prime time. Likewise, the remote 200 includes a clock 201 that provides a second value, T2, based on the remote time. In this embodiment, the remote 200 is arranged to compute the delay incurred by a message as it is transported via the channel from the prime 100 to the remote 200. The remote includes a processor 207 that determines this delay value, D, based on the mathematical difference between T2 and T1.

The channel 300 includes a link 301 for transporting messages in the direction from the prime to the remote. This is known as the "forward direction." The channel 300 also includes a link 303 for transporting messages in the direction from the remote to the prime. This is known as the "reverse direction."

The prime includes a transmitter 105 for transmitting messages to the remote via the link 301, and a receiver 109 for receiving messages from the remote via the link 303. As well, the remote includes a receiver 205 for receiving messages from the prime via the link 301, and a transmitter 211 for transmitting messages to the prime via the link 303.

The prime 100 and the remote 200 are each equipped with means for synchronizing their respective clocks to a common timing source provided by a global positioning system ("GPS") satellite 700. Thus, the satellite 700 emits a timing signal 701 that is received by a prime satellite receiver 121 and coupled to the prime clock 101 via a channel 123. Likewise, the signal 701 is received by a remote satellite receiver 221 and coupled to the remote clock 201 via a channel 223. Thus, both clocks 101 and 201 are synchronized to the same timing signal 701 and, as a result, the outputs of the clocks 101 and 201 are the same. Thus, T1 equals T2.

The satellite 700 is part of the Global Positioning System operated by the United States Department of Defense. The system provides position and time information world-wide to users equipped with suitable receivers. The theory of how time information is accurately communicated from GPS satellites to timing receivers is covered in detail in the book "GPS-A Guide To The Next Utility", by Jeff Hurn, published in 1989 by Trimble Navigation Limited, 645 North Mary Avenue, Sunnyvale, Calif. 94088. In practice, the satellite receivers 121, 221 may be any commercially available model such as, for instance, the SatSync Model 325 available from Odetics, 1515 South Manchester Avenue, Anaheim, Calif., 92802. Other vendors, such as Datum, Inc., 1363 South State College Blvd., Anaheim, Calif. 92806, and Ball Efratom Division, 3 Parker Street, Irvine, Calif. 92718, provide similar products. Typical GPS timing receivers provide an absolute timing accuracy of ±0.3 microseconds, and a frequency accuracy of at least 1 part in $10^{11}$.

The synchronizing signal 701 is broadcast by the satellite 700 on the L-band, on a GPS carrier frequency, i.e., either 1227.6 MHz or 1575.42 MHz.

Various GPS vendors provide timing receivers with various time format outputs. One common format is a one pulse-per-second ("1 PPS") signal. Another format is the Universal Coordinated Time ("UCT") signal. UCT is an internationally coordinated absolute time value maintained for the U.S. by the U.S. Naval Observatory.

In one embodiment, the clocks 101, 201 provide the values T1, T2 based directly on the UCT absolute time signal.

In another embodiment, the clocks 101, 201 use a 1 PPS signal to synchronize internal high-frequency clocks. For example, each clock 101, 201 may be equipped with a software timer which increments every $$\frac{1}{48000}$$

second and is reset to zero every second by the 1 PPS signal. Thus, at any time, the prime time T1 and the remote time T2 have the same same value, from 0 to 47999.

In this latter embodiment, synchronization between the internal clocks and the 1 PPS signal 701 is described as follows. If the software timer is consistently reset by the 1 PPS signal before it reaches a count of 47999, this indicates the the local-high frequency clock is running too slow. As a result, the local clock's frequency may be increased until the software timer is consistently reset at a count of 47999, thus correcting the clock frequency. Otherwise, if the software timer consistently counts higher than 47999 before it is reset, the local clock is running too fast, and thus the frequency may be reduced.

The processor 207 may be fabricated from a suitably-programmed processor. Also, the functions of the prime 100 may be controlled by a suitably-programmed processor located at the prime. Likewise, the functions of the remote 200 may be controlled by a suitably-programmed processor located at the remote.

Further, all other elements in the prime 100 and remote 200 may be fabricated from any commercially available parts. For instance, the channel 300 may be a commercially available microwave channel, or a data or a telephone line. The prime transmitter 105 and receiver 109, and the remote transmitter 211 and receiver 205 may be fabricated from suitable modems compatible with the channel 300. Such modems are available from a number of commercial vendors such as, for instance, Universal Data Systems, 5000 Bradford Drive, Huntsville, Ala. 35805. For example, if a voice-grade telephone line is used, then V.29-type modems may be used.

The process for FIG. 1 is now described. The process begins with the prime determining the value T1, based on the current prime time. Simultaneous with determining T1, the transmitter 105 sends a first message 107 to the remote via the link 301. The message may be, for instance, a suitably-encoded packet. The message 107 includes the value T1 embedded or encoded as part of the message packet. The message 107 may also include a predetermined header sequence to assist the remote 200 in identifying the message as the desired message for measuring the channel delay. For example, in a binary system, one such suitable header sequence might be 01111110.

Ultimately the message 107 will complete its transit on the link 301 and will arrive at the receiver 205. The time interval between the message 107 being transmitted by the transmitter 105 and being received by the receiver 205 is, of course, the channel delay for link 301 which is sought to be measured, D.

Upon arrival at the remote 200, the message 107 is received by the receiver 205. Simultaneous with the reception of the message by the receiver 205, the receiver causes the remote clock 201 to generate the value T2, based on the current remote time, via the enabling path 206. The receiver 205 also decodes the message to determine the value T1 encoded therein. The receiver then applies T1 to the processor 207 via the path 208. Likewise, the remote clock 201 applies T2 to the processor 207 via the path 203. Upon receipt of these two values, the processor 207 determines the value D based on the difference between T2 and T1.

If the values T1, T2 are absolute time values based on the UCT signal, then D may be directly obtained by subtracting T1 from T2. If the values T1, T2 are software timer count values from 0–47999 based on a 1 PPS signal, then D may be obtained by, first, subtracting T1 from T2 and, second, dividing the result by 48000.

The result D is then applied to the transmitter 211 via the path 209.

The transmitter 211 then sends a second message 213 to the prime via the link 303. The message 213 may be, for instance, a suitably-encoded packet in a format similar to the format of the message 107. The message 213 includes the value D embedded or encoded therein, and may also include a similar predetermined header sequence. Ultimately the message 213 will complete its transit on the link 303 and arrive at the receiver 109. The receiver 109 then decodes the message 213 to extract the value D encoded therein. This value is, of course, equal to the delay of the link 301.

Figure 2:
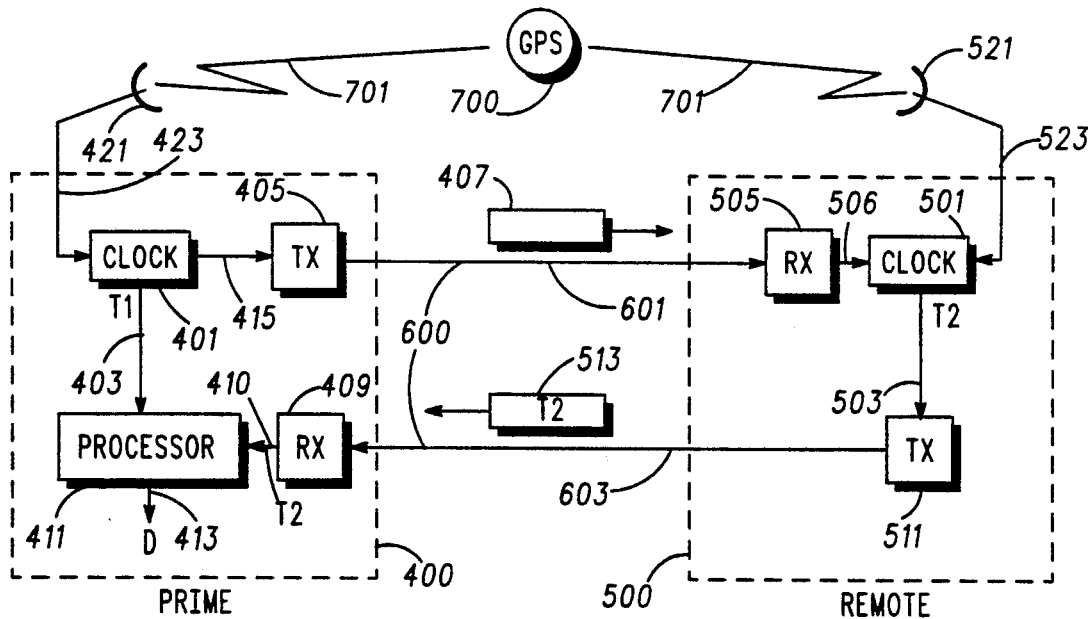
FIG. 2 is a block diagram that shows a prime coupled to a remote via a channel and arranged with a second embodiment of a technique for measuring channel delay, in accordance with the present invention.

Referring now to FIG. 2, there is depicted a communications system including a prime 400 coupled to a remote 500 via a channel 600. Similar to the first embodiment described above, the prime 400 includes a clock 401 that provides the value T1, based on the prime time. Likewise, the remote 500 includes a clock 501 that provides the value T2 based on the remote time. In this embodiment, the prime 400 is arranged to compute the delay D incurred by a message transported via the channel from the prime 400 to the remote 500 by means of a processor 411. The processor 411 determines D based on the mathematical difference between T1 and T2.

Similar to the first embodiment described above, the channel 600 includes a link 601 for transporting messages in the forward direction from the prime to the remote, and a link 603 for transporting messages in the reverse direction from the remote to the prime. As well, the prime includes a transmitter 405 coupled to the link 601 and a receiver 409 coupled to the link 603. Also, the remote includes a receiver 505 coupled to the link 601 and a transmitter 511 coupled to the link 603.

As in the first embodiment described above, the prime and the remote are each equipped with means for synchronizing their respective clocks 401, 501 to the GPS satellite 700. As before, the satellite 700 emits the synchronizing signal 701 that is received by a prime satellite receiver 421 and coupled to the prime clock 401 via a channel 423. Likewise, the signal 701 is received by a remote satellite receiver 521 and coupled to the remote clock 501 via a channel 523. As a result, both clocks 401 and 501 are synchronized to the GPS timing signal 701, and thus T1 equals T2.

The elements depicted in the second embodiment of FIG. 2 are equivalent to the corresponding elements depicted in the first embodiment of FIG. 1. As a result, corresponding elements in both embodiments may be fabricated from similar or even identical parts. The following table gives the correspondence of elements:

| Element in FIG. 1 | Element in FIG. 2 |
| --- | --- |
| 101 | 401 |
| 105 | 405 |
| 109 | 409 |
| 121 | 421 |
| 201 | 501 |
| 205 | 505 |
| 207 | 411 |
| 211 | 511 |
| 221 | 521 |
| 301 | 601 |
| 303 | 603 |

The process for FIG. 2 is now described. The process begins with the prime clock 401 determining the value T1. This value T1 is applied via a path 403 to the processor 411, where it is saved for later use.

Simultaneous with determining T1, the clock 401 causes the transmitter 405 to generate a first message 407 via an enabling path 415. The transmitter 405 then sends the message 407 to the remote via the link 601. Similar to the first embodiment described above and depicted in FIG. 1, the message 407 may be, for instance, a suitably-encoded packet. As well, the message 407 may include a predetermined header sequence to assist the remote 500 in identifying the message 407 as the desired message for measuring the channel delay.

Ultimately the message 407 will complete its transit on the link 601 and arrive at the receiver 505. The time interval between the message 407 being transmitted by the transmitter 405 and being received by the receiver 505 is, of course, the channel delay D for link 601 which is sought to be measured.

Upon arrival at the remote 500, the message 407 is received by the receiver 505. Simultaneous with the reception of the message by the receiver 505, the receiver causes the remote clock 501 to generate the value T2 by means of the enabling path 506. The resulting value T2 is then applied to the transmitter 511 via the path 503.

The transmitter 511 then sends a second message 513 to the prime 400 via the link 603. The message 513 may be, for example, a suitably-encoded packet in a format similar to the format of the message 407. The message 513 includes the value T2 embedded or encoded therein, and may also include a similar predetermined header sequence.

Ultimately the message 513 will complete its transit on the link 603 and arrive at the receiver 409. The receiver 409 then decodes the message 513 to extract the value T2 encoded therein. The receiver then applies T2 to the processor 411 via the path 410. The processor 411 then determines the value D based on the difference between the value T2 the value T1. This value is, of course, equal to the delay of the link 601.

In some cases the delay, D, itself may vary as a function of time. As a result, it may be desirable to repeat the above process (éither the embodiment of FIG. 1 or the embodiment of FIG. 2) a predetermined number of times, say z, in order to determine a set of delays delay$_1$, . . . , delay$_z$. After this set of values is available, the user may determine the worst-case delay by selecting the member of the set having the maximum value. Or else the user may select some other value associated with the set such as, for instance, the mean, median, or mode value, as the best measure of the delay.

In some cases, it may be desirable to periodically repeat the above process by programming a processor or controller to automatically perform the above steps (in accordance with either the embodiment of FIG. 1 or the embodiment of FIG. 2) after a predetermined period of waiting time, say "x", where x is expressed in a known unit of time such as, for instance, milliseconds, seconds, minutes, hours, days, etc.

Figure 3:
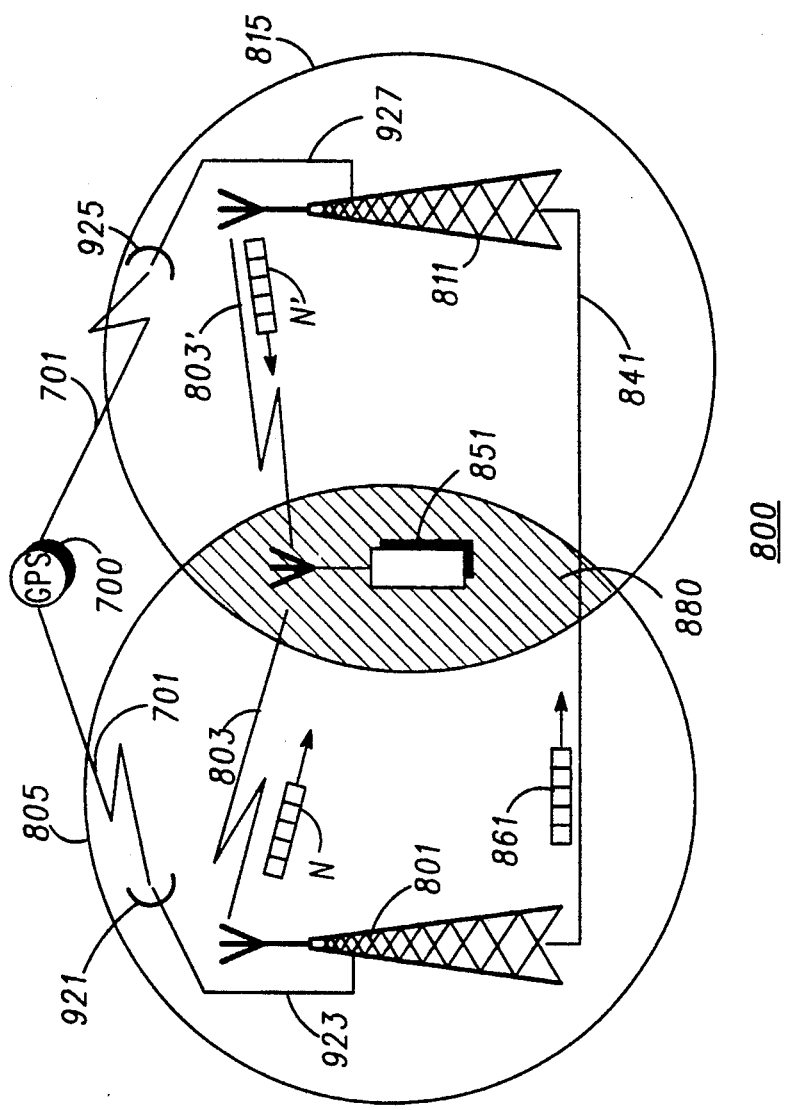
FIG. 3 is a block diagram showing a typical simulcast system suitable for demonstrating some advantages of the invention.

Referring to FIG. 3, there is depicted a typical simulcast radio frequency transmission system 800. The system 800 includes a prime site transmitter 801 (the "prime") with a coverage area 805, and a remote site transmitter 811 (the "remote") with a coverage area 815. The prime and the remote are connected by a distribution channel 841. The channel 841 may be, for instance, a telephone line or a microwave channel. Note that coverage areas 805 and 815 have, by design, an overlapping coverage area 880, within which a subscriber unit 851 receives transmissions from both transmitters. It is this overlapping coverage area 880 that incorporates simulcast technology to enhance the respective coverage areas of the transmitter sites involved.

As above, due to its being geographically located within the area 880, the subscriber unit 851 receives messages that are transmitted from both the prime transmitter 801 and the remote transmitter 811. As shown, the subscriber unit 851 receives a first version of a packetized message, N, from the prime 801 via a first radio frequency ("RF") channel 803, while simultaneously receiving a second version of the packetized message, N', from the remote 811 via a second RF channel 803'. The frequency of the channel 803 is identical to the frequency of channel 803'. Further, the messages N and N' are identical, except that they emanate from different transmitters.

To achieve a successful simulcast system such as that depicted in FIG. 3, it is vital to have the messages N and N' arrive at the subscriber unit 851 at precisely the same time. Assuming that the subscriber unit 851 is located equally distant from the transmitters 801 and 811, this can only occur if the messages N and N' are broadcast from their respective transmitters 801 and 811 at precisely the same time, or simultaneously (hence the name, "simulcast").

The fundamental problem with achieving proper simulcast operation in the system of FIG. 3, therefore, is how to achieve transmission of the message N' at the remote 811 at precisely the same time the message N is transmitted at the prime 801. Since site 801 is the prime site, the messages are formed at the prime 801 and sent via the channel 841 to the remote 811 for broadcast via the RF channel 803'.

In FIG. 3, for example, the message 861 is depicted as in the course of being transported from the prime 801 to the remote 811 via the distribution channel 841.

To guarantee a time-precise arrival of messages at the remote 811, therefore, the precise delay for messages transported from the prime 801 to the remote 811 by the channel 841 must be determined with precision. Once this one-way delay, D, is exactly known, then simultaneous transmissions of messages from both transmitters 801 and 811 may be achieved. This is done by the prime compensating for the delay, D, by sending the message N' to the remote 811 by an identical time, D, prior to broadcasting the message N from the prime 801.

To precisely measure the delay of channel 841, the simulcast system of FIG. 3 may be arranged to measure the delay of channel 841 in accordance with the present invention. Thus, the prime 801 is equipped with a GPS satellite receiver 921, which is coupled via the channel 923, and the remote 811 is equipped with a similar receiver 925, which is coupled to that site via the channel 927. Both receivers 921 and 925 are then arranged to receive the precise timing signal 701 from the GPS satellite 700.

Assuming the embodiment depicted in FIG. 1 is utilized, the prime 801 is thus arranged with a clock 101, a transmitter 105, and a receiver 109 in accordance with FIG. 1. Likewise, the remote 811 is arranged with a clock 201, a transmitter 211, a receiver 205, and a processor 207, all in accordance with FIG. 1. Further, the connections for channel 841 would be as depicted for the channel 300 in FIG. 1.

Otherwise, assuming the embodiment depicted in FIG. 2 is utilized, the prime 801 is arranged with a clock 401, a transmitter 405, a receiver 410, and a processor 411, all in accordance with FIG. 2. Likewise, the remote 811 is arranged with a clock 501, a receiver 505, and a transmitter 511, as per FIG. 5. Likewise, the connections for channel 841 would be as depicted for the channel 600 in FIG. 2.

As a result of arranging the simulcast system of FIG. 3 in accordance with the present invention, the prime 801 is able to accurately measure the delay of the channel 841. Note that the only delay of interest is the one-way propagation delay incurred by messages in transmit from the prime 801 to the remote 811, since only this delay is used in the simulcast operation.

As mentioned above, in the past this one-way delay was measured (perhaps "estimated" would be more accurate) by measuring the round-trip (two-way) delay for the channel 841, and then dividing by 2 to obtain the one-way delay. The result was generally incorrect since, due to physical imperfections and asymmetries in the channel, the two individual one-way delays comprising the round-trip delay were almost always unequal.

The advantage of the present invention, of course, is that only the desired forward delay from the prime 801 to the remote 811 is measured, and the reverse delay from the remote 811 to the prime 801 is ignored.

As an example, assume that channel 841 includes the following delays. Assume the delay for the forward direction (from the prime 801 to the remote 811) is $1.0 \times 10^{-3}$ second, or 1.0 millisecond (hereinafter "msec"). Also, assume the delay for the reverse direction (from the remote 811 to the prime 801) is 1.2 msec.

With the prior art measuring technique, the round-trip channel delay for channel 841 would be calculated as 1.0 (forward direction)+1.2 (reverse direction)=2.2 msec (round-trip). Moreover, the desired simulcast delay for the forward direction would be (erroneously) determined as $2.2 \div 2 = 1.1$ msec. thus yielding an error of 0.1 msec, or 100 microseconds (1 microsecond=$10^{-6}$ second).

As a result, the prime 801 would send the message N' to the remote 811 via the channel 841 a time period of 1.1 msec before the message N is broadcast from the prime 801. However, since the true channel delay is only 1.0 msec, this would result in the subscriber unit 851 receiving the two messages (N' and N) out-of-phase by 100 microseconds.

Assuming the message packet N consisted of 4-level symbols at 4800 symbols per second, this would typically result in a 35% probability (P=0.35) for the subscriber unit 851 receiving symbols with a bit error rate ("BER")$\leq 5\%$. If the minimum BER required for satisfactory operation is 5%, then the effective coverage for the area 880 would be only 35%.

For comparison, now assume that the simulcast time delay for channel 841 is measured in accordance with the technique of the present invention. With this technique, the round-trip delay is not measured, and only the desired (forward direction) channel delay is measured as 1.0 msec. This measurement may be as accurate as $\pm 0.3$ microseconds, which is the typical tolerance of modern GPS timing receivers.

As a result, the prime 801 would send message packets to the remote 811 via the channel 841 a time period of 1.0 msec before their scheduled broadcast from the prime 801. Since the true (forward direction) delay is 1.0 msec, the messages would be broadcast from the remote 811 at the same time with respect to the broadcast of the corresponding messages from the prime 801, with a timing error of $\leq 0.3$ microseconds. This would result in the subscriber unit 851 receiving the message N' from the remote 811 and the message N from the prime 801 at almost exactly the same time. As a result, the probability for the subscriber unit 851 receiving symbols with a BER$\leq 5\%$ would be increased to 100% (P=1.00). Since a BER of $\leq 5\%$ is the criteria for acceptable service, the effective coverage for the area 880 is now increased to 100%.

Moreover, not only does a technique for measuring channel delay, in accordance with the present invention, make the simulcast system of FIG. 3 efficient, but the technique is labor-efficient as well, since only one human user is necessary at the prime site location to initiate the test.

For example, this technique can be directly applied to digital simulcast systems. In such systems, all messages are time-stamped with their scheduled broadcast time. These messages are then sent via a distribution channel to the remote site in advance of their scheduled time for broadcast. The remote site then stores the messages for later broadcast when the scheduled broadcast time arrives.

In such a simulcast system, there will always be delay in the distribution channel connecting the prime to the remote. In such a synchronized system, without directly evaluating the distribution channel delay, the delay would have to be approximated, thus resulting in the delay being over-estimated. While this would still allow the remote to broadcast its message synchronously, it would compensate the efficiency of the system. This is because the broadcast of a message at the remote would be delayed longer than necessary, as the delay needed to deliver the message to the remote was over-approximated.

On the other hand, the present technique for measuring propagation delay, in accordance with the present invention, would enable a digital simulcast system to be optimized to operate with minimal throughput delay. In such a simulcast system, this optimization can be achieved, for instance, by programming the measurement to automatically occur after "x" amount of time. The delays needed to broadcast a synchronous simulcast message at the remote would thus be minimized, and without the intervention of a human technician.

Further, the present technique for measuring propagation delay, in accordance with the present invention, may also be of particular use for any commercial time service used by any industry involved with broadcast or navigation systems. If synchronous remote events, as seen by an outside observer, need to be set up at various sites in a communication network, they may be arranged to occur with minimum delay, by using the present technique.

While various embodiments of a technique for measuring channel delay, in accordance with the present invention, have been described hereinabove, the scope of the invention is defined by the following claims.

What is claimed is:

1. In a simulcast system having a prime transmitter site coupled to a remote transmitter site via a channel, the channel having a delay, the prime transmitter site having a prime clock for providing a first value ("T1") based on the current time at the prime transmitter site, the remote transmitter site having a remote clock for providing a second value ("T2") based on the current time at the remote transmitter site, the prime clock and the remote clock being synchronized with a common timing signal so that T2 equals T1, the simulcast system arranged for determining the worst-case delay in accordance with a predetermined method, the method comprising the steps of:

at the prime transmitter site:
(a) determining T1;
(b) simultaneous with step (a), sending a first message to the remote transmitter site;
(c) saving T1;

at the remote transmitter site:
(d) receiving the first message;
(e) simultaneous with step (d), determining T2;
(f) sending a second message to the prime transmitter site, the second message including T2;

at the prime transmitter site:
(g) receiving the second message;
(h) decoding the second message to determine T2;
(i) determining the delay based on the difference between T2 and T1;
(j) repeating steps (a) through (i) z times, thereby determining delay$_1$, ..., delay$_z$;
(k) determining the worst-case delay for the channel based on the maximum delay of the group of delays consisting of delay$_1$, ..., delay$_z$;
(l) waiting a predetermined time, and then repeating steps (a) through (k);
(m) after step (l), then repeating steps (a) through (l) for a predetermined number
(w) of times, thus determining the worst-case delay for the 1st trial, the worst-case delay for the 2nd trial, ..., the worst-case delay for the (w−1)th trial, and the worst-case delay for the wth trial;

where z is a predetermined number greater than 1, the predetermined number z being selected to determine the worst-case delay.

2. In the simulcast system of claim 1, the method further including the following prime transmitter step:
(n) determining whether the worst-case delay for the wth trial is greater than any member of the group consisting of the worst-case delay for the 1st trial, the worst-case delay for the 2nd trial, ..., and the worst-case delay for the (w−1)th trial.

3. In the simulcast system of claim 2, the method further including the following prime transmitter step:
(o) when the worst-case delay for the wth trial is greater than any member of the group consisting of the worst-case delay for the 1st trial, the worst-case delay for the 2nd trial, ..., and the worst-case delay for the (w−1)th trial, then determining the maximum value of the group consisting of the worst-case delay for the 1st trial, the worst-case delay for the 2nd trial, ..., and the worst-case delay for the (w−1)th trial.

4. In the simulcast system of claim 3, the method further including the following prime transmitter step:
(p) determining the difference between the worst-case delay for the wth trial and the maximum value of the group consisting of the worst-case delay for the 1st trial, the worst-case delay for the 2nd trial, ..., and the worst-case delay for the (w−1)th trial.

5. In the simulcast system of claim 4, the method further including the following prime transmitter step:
(q) adjusting the simulcast broadcast time by the difference between the worst-case delay for the wth trial and the maximum value of the group consisting of the worst-case delay for the 1st trial, the worst-case delay for the 2nd trial, ..., and the worst-case delay for the (w−1)th trial.

* * * * *